W. P. TRAVER & L. F. THEIS.
CABLE ARMOR JOINT.
APPLICATION FILED APR. 5, 1912.

1,035,499.

Patented Aug. 13, 1912.

WITNESSES
Frank Simney
A. H. Kephart.

INVENTORS
WALTER. P. TRAVER
LOUIS F. THEIS
BY Carlos P. Griffin
HIS ATTORNEY

UNITED STATES PATENT OFFICE.

WALTER P. TRAVER AND LOUIS F. THEIS, OF SAN FRANCISCO, CALIFORNIA.

CABLE-ARMOR JOINT.

1,035,499.  Specification of Letters Patent.  Patented Aug. 13, 1912.

Application filed April 5, 1912. Serial No. 688,640.

*To all whom it may concern:*

Be it known that we, WALTER P. TRAVER and LOUIS F. THEIS, citizens of the United States, residing at San Francisco, in the county of San Francisco and State of California, have invented a new and useful Cable-Armor Joint, of which the following is a specification in such full and clear terms as will enable those skilled in the art to construct and use the same.

This invention relates to an armor joint for submarine cables and its object is to provide means whereby the load may be entirely transferred to the armor at the place where one cable is joined to a fresh length of cable.

It will be understood by those skilled in the art that the armor surrounding the lead pipe covering and electrical cable is made of a very stiff springy wire, which tends to unwrap from the cable whenever it is cut loose therefrom. This unwrapping sometimes will occur at a distance of two hundred feet from the end of the cable in spite of the best efforts to prevent it. When the armor is so loosened on a cable it is substantially impossible to bring it up tight together, and it is likewise almost impossible to bring all of the load upon the cable. The result of this is that a portion of the load comes upon the lead pipe covering and electrical conductors with the result that the lead pipe will break at the joint, thus putting the cable out of service.

One of the objects, therefore, of this invention is to produce a device which will be capable of holding the cable armor so firmly against the lead pipe core as to prevent it unwinding and to provide means whereby the joint itself may be relieved of all strain.

Figure 1:
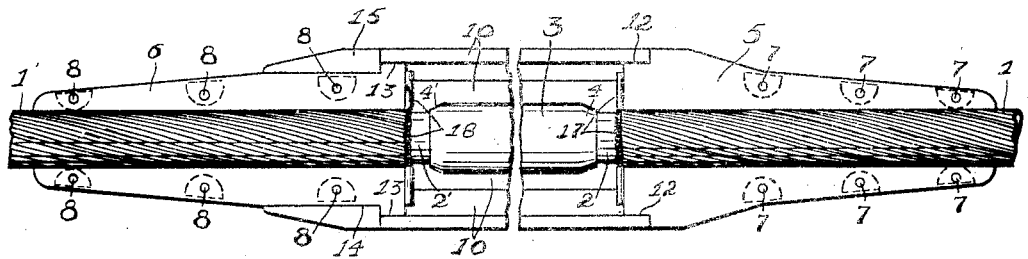
Figures 2, 3, 6:
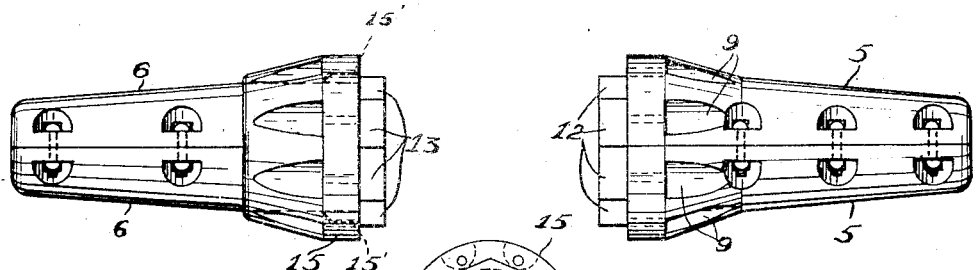
Figure 4:
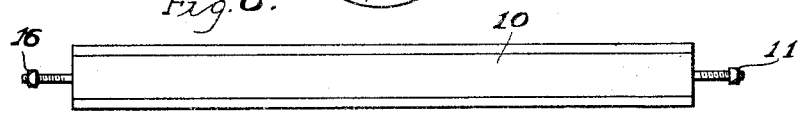
Figure 5:
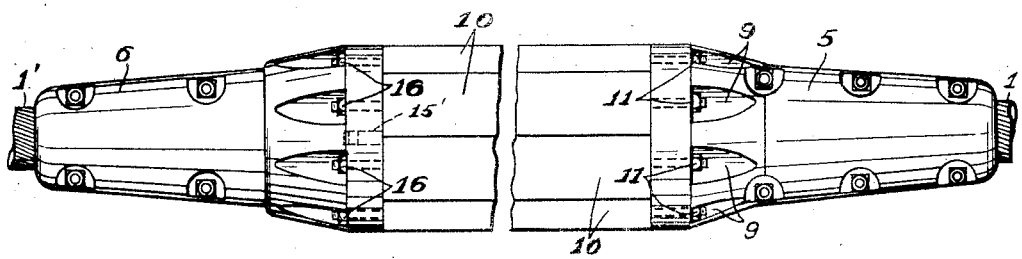

In the drawings in which the same numeral of reference is applied to the same portion throughout the several views, Figure 1 is a side elevation of a completed joint showing one half of each clamp in place and showing one of the connector bars, Fig. 2 is a plan view of one clamp, Fig. 3 is a plan view of the ring clamp showing the ring in place thereon, Fig. 4 is a plan view of one of the connector bars, Fig. 5 shows the completed joint, and Fig. 6 is an end view of the ring clamp showing the ring in place thereon.

The cable armor is indicated at 1 and 1', within which armor is the lead pipe 2 and 2', the lead pipes 2 and 2' being joined together by means of a lead pipe 3 slightly larger than either of them and which pipe has a wiped joint 4 and 4' to connect it with the pipes 2 and 2'. The clamps 5 and 6 each cover one half of the cable and have an opening therethrough of the same diameter as the cable over the armor. These clamps are suitably secured together by means of bolts passing through the holes 7 and 8, such a number of bolts being used as is deemed necessary to adequately secure the two parts of the clamps together. The clamp 5 has holes 9 therein parallel to the axis of the clamp, in which the threaded end of one of the connector bars 10 is placed, nuts 11 being used to tighten the connector against the clamp. There are such a number of connector bars 10 as will completely fill the circle at the outer edge of each of the clamps and said bars rest on the shoulders 12 formed on the clamp 5 and the shoulders 13 on the clamps 6. The clamps 6 each have a semi-circular ring 14 which, with the adjoining clamp, forms a complete circle and against which the ring 15 abuts. The ring 15 slides over the two clamps 6 when they are bolted in place and in this way the threaded ends of the connectors 10 may be inserted therethrough, suitable nuts 16 being used to tighten the connectors into place. Two lugs 15' project from the clamps 6 to prevent the ring 15 from turning.

In use the two clamps 5 are securely bolted in position on the cable and the ends of the cable armor projecting at 17 are bent up radially. The individual wires cannot move with respect to the clamp or cable. When the joint is completed the two clamps 6 are secured in position on the joined cable whereupon the wires 1' are bent up in the same way as the wires 1 as shown at 18, the distance between the two clamps being somewhat greater than the length of the connector bars between the threaded ends thereof, said connector bars are then placed on the clamp 5 whereupon the ring 15 is moved up on the opposite threaded ends thereof and the nuts 16 are put in place and sufficient pressure is brought to bear upon the connector bars to relieve the lead cable of all load at the wiped joint.

Having thus described our invention what we claim as new and desire to secure by Let- ters Patent of the United States, is as follows:

1. A cable armor joint comprising clamps to be connected to a cable and threaded bars to be connected to said clamps to relieve the cable of all load between the clamps, as described.

2. In a cable armor joint, clamps to be secured to a cable, threaded bars connected with one set of clamps and a slidable ring on the clamp and with which the threaded bars are connected, as described.

3. In a cable armor joint, sets of clamps, bolts to secure said clamps to a cable, threaded bars connected with one of said sets of clamps, and a ring slidable over the other set of clamps and with which said threaded bars are connected to carry the load at said joint, as described.

4. In a cable armor joint, two sets of clamps and bolts to secure said clamps to a cable, threaded bars connected with one of said sets of clamps, a ring slidable over the other set of clamps and with which said threaded bars are connected, and means carried by said second set of clamps to prevent said ring from rotating, as described.

5. In a cable armor joint, two sets of clamps and bolts to be secured to a cable, flat bars having a threaded projection at each end thereof and carried by one of said sets of clamps, and a ring slidable over the other set of clamps and to which the threaded projections on said bars are connected, as described.

In testimony whereof we have hereunto set our hands this 28" day of March A. D. 1912, in the presence of the two subscribed witnesses.

WALTER P. TRAVER.
LOUIS F. THEIS.

Witnesses:
C. P. GRIFFIN,
L. H. ANDERSON.